(12) United States Patent
Gray et al.

(10) Patent No.: US 6,391,374 B1
(45) Date of Patent: May 21, 2002

(54) SOY-BASED FOOD PRODUCTS AND METHODS

(75) Inventors: Jonathan Arthur Gray, Farmington, AR (US); Nicholas Louis Rozzi; Laura Ann Zimmer, both of West Lafayette, IN (US); Atina Marie Biehle, North Vernon, IN (US); Avery Kent Solco, Quezon (PH); Aaron Lee Davis, Columbus, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 09/562,127

(22) Filed: May 1, 2000

(51) Int. Cl.$^7$ .................................................. A23L 1/20

(52) U.S. Cl. ........................... 426/634; 426/96; 426/97; 426/98; 426/619; 426/620; 426/621

(58) Field of Search ........................... 426/634, 96, 97, 426/98, 619, 621, 620

(56) References Cited

U.S. PATENT DOCUMENTS

| | | | |
|---|---|---|---|
| 3,121,637 A | * 2/1964 | Clausi et al. | |
| 3,662,673 A | 5/1972 | Boyer et al. | |
| 3,687,686 A | 8/1972 | Bedenk | 99/83 |
| 3,689,279 A | 9/1972 | Bedenk | 99/83 |
| 3,753,728 A | 8/1973 | Bedenk et al. | 99/81 |
| 3,814,824 A | 6/1974 | Bedenk et al. | 423/342 |
| 3,821,443 A | 6/1974 | Halladay et al. | 426/93 |
| 3,920,852 A | 11/1975 | Haas | 426/62 |
| 3,976,793 A | 8/1976 | Olson et al. | 426/96 |
| 4,153,738 A | * 5/1979 | Ronai et al. | |
| 4,478,857 A | 10/1984 | Stauss | 426/72 |
| 4,830,871 A | * 5/1989 | Takenawa et al. | |
| 5,035,914 A | 7/1991 | Doerr | 426/621 |
| 5,510,130 A | 4/1996 | Holtz et al. | 426/93 |
| 5,591,471 A | 1/1997 | Niwano et al. | 426/440 |

OTHER PUBLICATIONS

BeMiller, J.N., Whistler, R.L., "Carbohydrates" in *Food Chemistry* 3$^{rd}$ Edition, (Fennema, O.R., Ed.), Marcel Dekker, Inc., New York, pp. 157, 201–204 (1996).
Burns, R.E. and Fast, R.B., "Application of Nutritional and Flavoring/Sweetening Coatings" in *Breakfast Cereals and How They are Made*, Fast, RB. and Caldwell, E.F., Eds., American Association of Cereal Chemists, Inc., St. Paul, MN, pp. 195–220 (1990).
Caldwell, E.F., et al., "Unit Operations and Equipment I:Blending and Cooking" in *Breakfast Cereals and How They are Made*, Fast, RB. and Caldwell, E.F., Eds., American Association of Cereal Chemists, Inc., St. Paul, MN, pp. 43–57 (1990).

Caldwell, E.F. et al., "Unit Operations and Equipment III. Tempering, Flaking and Toasting" in *Breakfast Cereals and How They are Made*, Fast, RB. and Caldwell, E.F., Eds., American Association of Cereal Chemists, Inc., St. Paul, MN, pp. 109–133 (1990).
Cullen, K., "Students' soy invention could enjoy a taste of success" Web Edition reprinted in Lafayette Journal and Courier, Sep. 7, 1999. Web site: http://www.jconline.com/news/news0907/0907106.htm (1999).
Dansby, A. "Purdue Students win food fight at IFT's meeting" Web site: http//www.ift.org/sc/news_rel/990729.html (Jul. 29, 1999).
Erdman, J.W. Jr.,. "Nutritive Value of Soybean Protein"In *Soybean Utilization Alternatives*, Mcann, L., Ed., pp. 169, 171–172 (1988).
Faller, J.Y., et al., "Characterization of Corn–Soy Breakfast Cereals by Generalized Procrustes Analyses" *Cereal Chem.* 75(6):904–908 (1998).
Fast, R.B., "Manufacturing Technology of Ready–to Eat Cereals" in *Breakfast Cereals and How They are Made*, Fast, RB. and Caldwell, E.F., Eds., American Association of Cereal Chemists, Inc., St. Paul, MN, pp. 15–29, 41 (1990).
Gallaher, D. and Schneeman, B.O. "Nutritional and Metabolic Response to Plant Inhibitors of Digestive Enzymes" in *Nutritional and Toxicological Significance of Enzyme Inhibitors in Foods, Advances in Experimental Medicine and Biology*, 199:167–172 (1986).
Gibson, L. "State of the Industry Report Breakfast Cereals in the U.S." *Cereal Foods World* vol. 42, No. 6: 452–455 (1997).
Hettiarachchy, N. and Kalapathy, U., "Soybean Protein Products" in *Soybeans: Chemistry, Technology, and Utilization*, Liu, K., Ed., Chapman and Hall, pp. 379–411 (1997).
Mermelstein, N.H. "Purdue wins Competition" in *The Institute of Food Technologist Meeting and Expo News*, Jul. 27–28, 1999.
Messina, M.J. "Soyfoods: Their Role in Disease Prevention and Treatment" in *Soybeans: Chemistry, Technology, and Utilization*:Liu, K., Ed., Chapman and Hall, pp. 442–477 (1997).
Proctor, A., "Soybean Oil Extraction and Processing" in *Soybeans: Chemistry, Technology, and Utilization* Liu, K., Ed., Chapman and Hall, pp. 297–313 (1997).
Riaz, M.N. "Healthy Baking with Soy Ingredients", *Cereal Foods World* vol. 44, No. 3 36–139 (1999).

(List continued on next page.)

*Primary Examiner*—Anthony J. Weier
(74) *Attorney, Agent, or Firm*—Greenlee Winner and Sullivan PC

(57) ABSTRACT

Soy-based, flaked food products are provided. In one form, the food product includes defatted soy flakes, an exogenous source of protein and isolated starch. The product may further include a cereal grain, wherein the defatted soy flakes are present in the product in greater amounts by weight than the cereal grain. The defatted soy flakes may be pre-toasted to reduce the bittery, beany off-flavors of the soybean. Methods of producing the soy-based, flaked food products are also provided.

22 Claims, No Drawings

OTHER PUBLICATIONS

Riaz, M.N. "Soybeans as Functional Foods" *Cereal Foods World* vol. 44, No. 2: 88–92 (1999).

Rosso, C. "Student Contest Shows Off Ideas for Future Food", Web Edition reprinted in Chicago Tribune, Aug. 4, 1999.

Sipos, E.F. "Edible Uses of Soybean Protein", Technical Bulletin HN–12 of The American Soybean Association, pp. 57–72 (1990).

Snyder, H. E., Kwon, T.W., "Nutritional Attributes of Soybeans and Soybean Products" in *Soybean Utilization*, Van Nostrand Reinhold Co., New York, pp. 186–193 (1987).

Snyder, H. E., Kwon, T.W., "Soy Protein Food Products" in *Soybean Utilization*, Van Nostrand Reinhold Co., New York, pp. 264–269 (1987).

Tribelhorn, R.E., "Breakfast Cereals" in *Handbook of Cereal Science and Technology*, Lorenz, K.J. and Kulp, K., Eds, Marcel Dekker, Inc., New York, pp. 741–762 (1991).

Wolf, W.J. and Cowan, J.C., "Soybeans as Food Source", CRC Press, Cleveland, OH, pp. 43–53, 65–67 (1975).

Wolf, W.J. "Soybeans and Other Oilseeds " in *Kirk–Othmer Concise Encyclopedia of Chemical Technology*, 4th Edition, Wiley, New York, vol. 22, 591–619 (1999).

"Breakfast Cereals" in *Principles of Cereal Science and Technology*, $2^{nd}$ edition, Hoseney, R.C., Ed., American Association of Cereal Chemists, Inc, St. Paul, MN, pp. 335–345 (1996, 1994, second printing 1998).

\* cited by examiner

SOY-BASED FOOD PRODUCTS AND METHODS

BACKGROUND OF THE INVENTION

The present invention relates generally to soy-based food products. Specifically, the invention relates to soy-based food products that include pre-toasted defatted soy flakes, in combination with selected components that provide for a palatable food composition.

Soybeans are widely recognized by medical and health professionals for their health benefits. [Riaz, (1999) "Healthy Baking with Soy Ingredients", *Cereal Foods World*, 44(2):88–92]. Various constituents of soybeans, including soy protein and isoflavones, have been linked to the health benefits of soybeans. As one example, soy protein has been found to reduce the risk of coronary heart disease when consumed at about 6.25 g/serving/day as part of a diet low in saturated fat and cholesterol. Attempts have therefore been made to incorporate various forms of soybean into food products.

For example, soy proteins have been incorporated into cereal food products. Some of these food products include soy protein isolates, soy protein concentrates and soy flour. In order to obtain these sources of protein, the defatted soy flake starting material, obtained after extracting soybean oil from soybeans, must be further processed or otherwise refined, which leads to an increase in the cost of the final product.

A further drawback of soybeans are their beany, bittery off-flavors, caused, in part, by lipid peroxidation catalyzed by lipooxygenase. Attempts to reduce the off-flavors in soybeans have included enzymatic pretreatment of the soy protein, or addition of yeast or sodium bicarboatlo the soy product. However, some of these treatments add to an increased cost of the final product, and may not result in a food product that is optimized with respect to texture, structure and overall palatability. Moreover, certain forms of processed soybeans are relatively unpalatable. For example, inclusion of primarily defatted soy flakes in a food product can lead to a gritty, unpalatable mixture. There is therefore a need in the art for an inexpensive, ready-to-eat food product that takes advantage of the low cost of defatted soy flakes as a starting material, includes all of the advantages of soy products, and has an optimal palatability. The present invention addresses this need.

SUMMARY OF THE INVENTION

It has been discovered that defatted soy flakes, which traditionally have a gritty, unacceptable texture, may form the basis of a nutritious, delicious food product having an acceptable texture when combined with selected palatable components. Accordingly, in one form of the invention, a soy-based food product that includes defatted soy flakes, an exogenous source of protein and isolated starch is provided. Soy off-flavors may be advantageously reduced by pre-toasting the defatted soy flakes prior to combining them with the other components of the product. Such pretreatment advantageously substantially inactivates or otherwise denatures enzymes, such as lipooxygenases, present in the soy flakes, the activity of which contributes to the off-flavors. Moreover, soy off-flavors may be further reduced by including sodium bicarbonate in the food product. In yet another form of the invention, the food product may be a soy-based cereal food product and thus include a cereal grain in addition to the other components described above. In further forms of the invention, the food product may also include flavoring agents, as well as a coating that may include flavoring agents and a vitamin and/or mineral mixture. In yet other embodiments, a soy-based flaked food product includes a flaked food product having pre-toasted defatted soy flakes incorporated therein is provided.

In another aspect of the invention, methods for producing the food product are provided and include, in another form of the invention, providing, preferably pre-toasted, defatted soy flakes and incorporating the flakes into a flaked food product. In preferred embodiments, a method includes providing defatted soy flakes, preferably pre-toasted, combining the above-described components and processing the mixture into a flaked food product. The food product produced may include up to 100% of the Recommended Daily Allowance (RDA) for 10 essential vitamins and minerals. The soy-based food product is low in fat, cholesterol free and an excellent source of protein.

It is an object of the invention to provide soy-based food products wherein soy off-flavors are reduced.

It is a further object of the invention to provide low cost, nutritious, palatable soy-based food products, and methods for their production.

These and other objects and advantages of the present invention will be apparent from the following description.

DESCRIPTION OF THE PREFERRED EMBODIMENTS

For the purposes of promoting an understanding of the principles of the invention, reference will now be made to preferred embodiments and specific language will be used to describe the same. It will nevertheless be understood that no limitation of the scope of the invention is thereby intended, such alterations and further modifications of the invention, and such further applications of the principles of the invention as illustrated herein, being contemplated as would normally occur to one skilled in the art to which the invention relates.

The present invention provides a soy-based, flaked food product that includes pre-toasted, defatted soy flakes, an exogenous source of protein and isolated starch. It has been unexpectedly discovered that an exogenous source of protein and isolated starch, when combined with defatted soy flakes, masks or otherwise reduces the gritty texture of the soy flakes so that a nutritious, delicious food product is obtained having a desirable texture and taste. A cereal grain is also preferably included to further favorably enhance the texture and taste of the product. Moreover, the beany and bittery off-flavors associated with soy-based products are substantially reduced by a pre-toasting step. As soy flakes are utilized as a starting material, the food product described herein is an inexpensive way to enable consumers to enjoy the nutrition and other benefits of soy products. The preferred food product has a texture that is crisp and crunchy, and is able to hold its structure (i.e, will not fall apart and/or become soggy) in milk longer than flakes made from other products. The food product may be eaten anytime as a snack, with or without milk, or as a breakfast food. The preferred soy-based, flaked food product described herein is an excellent source of protein, a good source of fiber, is low in fat and is cholesterol-free. Methods for producing the soy-based, flaked, food products are also provided.

In one aspect of the invention, a soy-based, flaked food product is provided. The food product includes defatted, desolventized soy flakes (also known as "white" or "spent" flakes), isolated starch and an exogenous source of protein. A cereal grain is also preferably included in the food product. The defatted soy flakes may be obtained as a by-product of soybean oil processing as known in the art and as briefly described below.

In a typical operation, soybeans may first be cleaned and dried. The soybeans are then cracked, dehulled, and treated with steam to facilitate flaking, prior to being extracted with hexane to remove the oil. After lipid extraction, the flakes retain their carbohydrate and fiber components and only trace levels of fat remain. After solvent extraction, the flakes are flash-desolventized by quick heating with superheated hexane vapor as known in the art to remove hexane for safe consumption by humans and may typically be purchased in this form. This flash-desolventization step also denatures, to a certain extent, trypsin inhibitors and enzymes that play a role in contributing to off-flavors, such as lipooxygenase [Hettiarachchy, N. and Kalapathy, U., "Soybean Protein Products", Ch. 8 in *Soybeans: Chemistry, Technology, and Utilization*, Liu, K. (Ed.), pp. 379–411, Chapman and Hall, NY (1997)]. Although further denaturation of these enzymes may be accomplished in other steps of forming the final food product, it has been found that a pre-toasting step, defined herein to mean a step that functions to reduce soy off-flavors compared to the commercially obtained defatted soy flakes, typically by substantially inactivating lipooxygenases, or other enzymes that play a role in contributing to soy off-flavors.

The pre-toasting step is typically performed at a temperature and for a time period sufficient to reduce the beany, bitter flavor of the soybeans. As an example, the pre-toasting step may include heating the defatted soy flakes at a temperature of about 100° C. to about 300° C., preferably at about 150° C. to about 300° C. and most preferably at about 200° to about 300° C., for a period of about 3 minutes to 10 minutes. A most preferred pre-toasting step is performed at about 205° C. for about 5 minutes. This step advantageously removes residual hexane, in addition to reducing soybean off-flavors and provides a food product having an acceptable or otherwise improved taste. The pre-toasting step also contributes to the toasted brown color of the food product. The pre-toasting step is distinguished from, and is accomplished in addition to, the commercial flash-desolventizing step. It has been found that, if the pre-toasting step is accomplished during the cooking step after all of the components of the food product are mixed together, the amount of further cooking that would be needed to obtain an equivalent reduction in off-flavors results in a burnt, or otherwise darkened or blackened product, which significantly adversely affects the texture, appearance and flavor of the product, thereby making it undesirable for consumption.

The defatted soy flakes obtained commercially may have a thickness in the range of about 0.25 mm to about 0.37 mm, and more preferably have a thickness in the range of about 0.25 mm to about 0.30 mm. The flakes may be variously shaped and the average size of the defatted soy flakes will depend on the source of the flakes. Although the defatted soy flakes are typically no larger than about 10 mesh, the mesh size may range from about 10 mesh to about 80 mesh. The defatted soy flakes are typically included in the food product in an amount of at least about 30%, preferably about 30% to about 70%, and more preferably about 40% to about 60% by weight of the dried food product. The defatted soy flakes contribute to the texture, flavor and nutritional benefits of the food product. The defatted soy flakes alone include about 50% protein by weight of the defatted soy flakes, and thus greatly contribute to the protein content of the food product.

The exogenous source of protein also contributes to the texture, flavor and nutrition of the food product. As used herein, an exogenous source of protein includes a protein that has been isolated from its respective source and that is included the food product in addition to any protein contributed by the other protein-containing components of the food product, including the defatted soy flakes and cereal grain. An exogenous source of protein may also include the source from which the protein was isolated, as long as the source includes at least about 50% by weight protein, and preferably about 80% to about 100% by weight protein and contributes palatable, or otherwise suitable, characteristics. A wide variety of exogenous sources of proteins may be included in the food product. For example, the proteins may be isolated from corn, oat, wheat, rye, barley, rice, sorghum, a combination thereof, or from some other source of protein. Many of these proteins may be obtained commercially, or may be isolated by methods well known to the skilled artisan. It is preferred that the protein be obtained from soybeans. For example, the protein may be a soy protein isolate, a soy protein concentrate or may be contributed by soy flour, although soy protein isolates are preferred exogenous sources of protein. The various soy sources of protein may be obtained commercially, or may be isolated from soybeans by well-known methods in the art. Typically, the exogenous source of protein is included in the product in an amount of at least about 1% by weight, preferably about 1% by weight to about 30% by weight, and more preferably about 10% by weight to about 20% by weight of the dried food product.

Proteins are known to be responsible for a wide variety of functional properties of food systems. Although not being limited by theory, the protein in the food product described herein is believed to provide, for example, solubility, water adsorption and retention, cohesion and adhesion, stabilization and may provide other beneficial properties. Such properties advantageously improve dough handling and the shelf-life of the product. Although a majority of the functional properties of soybeans are attributed to the protein fraction, carbohydrates of the soybeans are also known to be responsible for some of the functional properties. For example, it is known that oligosaccharides in soy can absorb water, causing the system, when extruded, to expand and provide a fibrous, lacy network as described in Wolf, W. J. and Cowan, J. C. (1975) *Soybeans as a Food Source*, CRC Press, Inc., Cleveland, Ohio, p. 43.

As used herein, isolated starch is starch that is added to the food product in addition to the starch that is present in the starch-containing components of the food product, such as the soy flakes and the cereal grain. Starch may be isolated from a wide variety of sources. For example, starch may be obtained from a variety of plants, including cereals such as corn, oat, wheat, rye, barley, rice, sorghum, as well as from other sources, such as cassava and tubers of potato plants, and combinations of any of these sources. The starch may be isolated from these sources by methods known to the skilled artisan, although many of the starches described herein are available commercially. In preferred embodiments, the starch is corn starch. In more preferred embodiments, the starch is a modified food starch, including modified corn starch.

Modified food starches are well known in the art and are described, for example, by Bemiller, J. N. and Whistler, R. L., "Carbohydrates", Ch. 4 in *Food Chemistry*, $3_{rd}$ edition, Fennema, O. R., Marcel Dekker, Inc. (Eds.), pp. 201–204, New York (1996). Briefly, modifications to food starch include, for example, crosslinking of polymer chains, non-cross-linking derivatization, depolymerization and pregelatinization. Chemical reactions most frequently used to produce modified food starches include, for example, esterification with acetic anhydride, succinic anhydride, the mixed anhydride of acetic and adipic acids, 1-octenylsuccinic anhydride, phosphoryl chloride, sodium trimetaphosphate, sodium tripolyphosphate, and monosodium orthophosphate; etherification with propylene oxide; acid modification with hydrochloric and sulfuric acids: bleaching with hydrogen peroxide, peracetic acid, potassium permanganate, and sodium hypochlorite; oxidation with sodium hypochlorite; and various combinations of these reactions. A most preferred modified food starch is corn starch modified by cross-linking or pregelatinization. The modified food starches may be produced by methods known to the art and/or may be purchased commercially.

The food starch advantageously contributes to the flavor and texture of the food product. Moreover, food starch also advantageously improves the shelf-life of the product, acts as a humectant and a binder for oils and fats as known in the art. The food starch may be included in the food product in an amount of from about 0.5% by weight to about 15% by weight, preferably about 0.5% by weight to about 10% by weight, and further preferably about 3% by weight to about 6% by weight of the dried food product.

It is preferable to add cereal grains to the flaked food product to form a soy-based, flaked cereal food product,. as the cereal grains also contribute to the texture, flavor and nutrition of the food product. A wide variety of cereal grains may be utilized. For example, corn, oats, wheat, sorghum, rye, rice and combinations thereof may be incorporated into the food product. The cereal grain may be provided in a variety of forms, including flour, grits and cereal meal. In a preferred form of the invention, the cereal grain is corn meal. Cereal meal, such as corn meal, advantageously improves the texture of the flaked food product and further adds structure to the product. That is, the cereal meal helps the cereal keep its form when placed in a liquid medium, such as milk. Moreover, the cereal grain is incorporated into the food product typically in an amount no more than about 30%, preferably no more than about 20%, and more preferably no more than about 10% by weight. The cereal grain may further be preferably incorporated into the food product in an amount of about 3% to about 20%, and more preferably about 5% to about 10%, based on the weight of the dried food product. A greater amount of defatted soy flakes by weight are preferably included in the food product than the cereal grain. Typically about 5 fold to about 10 fold more defatted soy flakes are included in the food product than the cereal grain by weight.

Other components or agents that may affect flavor, texture and/or may further mask soybean off-flavors may be included in the flaked food product. For example, flavoring agents may be added to enhance the flavor and/or texture of the product. A wide variety of flavoring agents may be used, including dextrose, brown sugar, cereal malt syrup, corn syrup, molasses, honey, sorbitol, sucrose (sugar), salt, honey flavoring, or other natural or synthetic flavors or sweeteners. Sucrose is a preferred flavor enhancer and texturizer. Although any form of sucrose may be added, granular sucrose is most preferred. Sucrose may function in improving extrudability factors of cereals, improving texture profiles of cereals, and may be effective in controlling gelatinization of starch. The flavoring agents, especially those that add a sweet flavor to the product, have also been found to help mask any residual off-flavors. The flavoring agents may be added to the food product in an amount of about 0.2% by weight to about 25% by weight, and preferably about 15% by weight to about 20% by weight of the dried food product.

As mentioned above, salt (sodium chloride) may be added to the product as a flavoring agent. Salt may be added to the food product in relatively small amounts, such as about 1% to about 2% by weight of the dried food product, although more or less may be added depending on the taste desired. Moreover, sodium bicarbonate may be added to further mask any residual off-flavors. Typically, about 0.5% by weight to about 2% by weight, preferably about 1% by weight to about 2% by weight sodium bicarbonate is added to the food product, although more or less may be added depending on the taste desired.

The soy-based food product may also include a coating of vitamins and/or minerals. The coating may further include other flavoring agents, such as sweetening agents, as described above to further mask any residual off-flavors. A wide variety of vitamins may be included in the coating. For example, the vitamin coating may include vitamins A, $B_1$, $B_2$, $B_3$, $B_6$, $B_{12}$, C, D, E, K, biotin and calcium pantothenate, or other desired vitamins. The coating may include minerals such as iron, zinc oxide, copper gluconate and potassium iodide, or other desired minerals. The vitamin/mineral mix is typically provided as a solid that may be dissolved in a flavoring agent liquid carrier. The flavoring agent liquid carrier may include a combination of the flavoring agents described herein. For example, the liquid carrier may include corn syrup, such as high fructose corn syrup, with honey flavoring. The honey-flavored syrup provides a medium for the vitamin pre-mix to be applied, while protecting temperature sensitive vitamins, such as vitamins A and D, from oxidative degradation caused by contacting them with a hot surface of the food product after the food product is cooked. The vitamin/mineral mix is included in the carrier/flavoring medium in an amount to provide at least about 1%, preferably at least about 5%, further preferably at least about 10%, more preferably at least about 25%, further more preferably at least about 50% and most preferably at least about 100% of the recommended daily allowance (RDA) in a single serving, such as a 30 g serving, after the carrier/flavoring medium is sprayed onto the food product. The flavoring agents that are included in the coating contribute about 0.2% by weight to about 3% by weight of the dried food product. As an example, the corn syrup is included in the coating of the dried food product so that it contributes about 1% by weight to about 3% by weight of the dried food product after the coating is applied and dried. The honey-flavoring is included in the coating in an amount of about 0.3% to about 0.6% by weight of the dried food product.

In yet another aspect of the invention, methods of forming a soy-based, flaked food product are provided. In one form of the invention, defatted soy flakes that have been flash-desolventized as described above are first toasted, according to the pre-toasting step described above, and are then combined with the other dry ingredients and mixed with water, typically in a ratio of dry ingredients to water of about 1:1 to about 1:2.5, preferably 1:1.5 to about 1:2, to form a dough. The dough is kneaded until all the ingredients are thoroughly mixed. Pellets are then typically formed that range in size from about 4 mm to about 8 mm in diameter. The pellets then undergo a tempering process by being exposed to room temperature (i.e., about 20° C. to about 30° C.) air, for a period of about 1 hour to about 3 hours. The pellets are then flaked utilizing appropriate equipment, such as a manual pasta maker, prior to being cooked, or otherwise baked, at a minimum temperature of about 150° C., but may be cooked at about 150° C. to about 300° C., for a period of about 10 to about 20 minutes. The cooked dough is then cooled at room temperature. The moisture content of the final, dried food product is typically less than about 3% by weight of the dried food product.

The flakes may then be coated with a desired coating that includes a vitamin/mineral composition as described above. The coating is dried, typically at room temperature, and the dried food product is then cooled prior to packaging. Alternatively, higher temperatures may be used to dry the coating, such as a temperature of no more than about 35° C. Such an elevated temperature facilitates the application of the coating and may prevent the oxidative damage of heat labile vitamins that may occur at a temperature higher than about 35° C.

The dried food product may then be packaged. The packaging of the food product generally protects the product from moisture gain that may result in loss of crispness, lipid oxidation that may result in rancidity and off-flavors and loss of vitamins due to oxidation. The food product may be packaged in similar cereal-food product packages known in the art. However, a preferred package may include multi-layer bags, preferably made from oriented polypropylene (OPP) coated with polyvinylidene chloride (PVdc), an adhesive and low-density polyethylene (LDPE). The printing for the packaging may be on the inside of the LDPE layer. This may prevent the printing from being rubbed off during shipping and handling by the consumer since the LDPE will cover the printing. By using multiple layer packaging, the barrier properties of each packaging material can be maximized. The cereal bag can have a zip-lock closure for consumer convenience. Butylated hydroxytoluene (BHT), an antioxidant, may be integrated with the OPP to help prevent oxidative damage of vitamins and any lipids present in the food product. Packaging the food product in plastic bags may reduce the cost of the product compared to the cost of packaging in traditional boxes. Table 1 below discloses preferred properties of the packaging materials.

TABLE 1

| | Low Density Polyethylene | Oriented Polypropylene | Plasticized Polyvinylidine chloride |
|---|---|---|---|
| Yield ($M^2$/kg) | 42.6 | 44.0 | 27.0–30.5 |
| Tensile Strength ($MN/m^2$) | 8.6–17.3 | 165–170 | 27.6–34.5 |
| Water Vapor Transmission ($g/m^2$/day) at 90% R.H.† and 38° C. | 15–20 | 7 | 15–40 |
| Oxygen Permeability ($cm^2/m^2$/day/atm) | 6500–8500 | 2000–2500 | N/A |
| Resistance to Grease and Oils | Some oils cause swelling | Excellent | Depends on exact formulation |

†Relative Humidity

Reference will now be made to specific examples illustrating the compositions and methods above. It is to be understood that the examples are provided to illustrate preferred embodiments and that no limitation to the scope of the invention is intended thereby.

EXAMPLE 1

Soy-Based, Flaked, Ready-To-Eat Cereal Food Product

A food product was prepared as in example 2 below that included, all on a dry weight/weight basis, 55% defatted soy flakes, 13% soy protein isolate, 4.9% corn meal, 4% corn starch, 18% sucrose, 1% salt, 1% sodium bicarbonate, and 0.2% honey flavoring. The food product was coated with a coating that contributed 1.75% by weight high fructose corn syrup, 0.85% by weight of a vitamin/mineral composition and 0.3% by weight honey flavoring to the dried food product. This cereal food product will hereinafter be referred to as "Soy-Pro".

EXAMPLE 2

Methods of Producing Soy-Pro
Toasting of the White Flakes

White flakes, obtained from Cargill, Inc., were first lightly pre-toasted at a temperature of about 205° C. for a period of about 5 minutes. Defatted soy flakes, soy protein isolate, corn meal, corn starch, sucrose, salt, sodium bicarbonate and honey flavoring, in the amounts listed in example 1 above, excluding the coating components, were combined with water in a weight ratio of dry ingredients to water of about 1:1.5. After the dough was thoroughly mixed, pellets of about 5 mm to about 6 mm in diameter were formed. The dough was then allowed to temper at room temperature (25° C.) for a period of 2 hours. The pellets were rolled into flakes utilizing a manual pasta maker. The resultant flakes were then cooked at a temperature of 190° C. for a period of 10 minutes. A coating solution that included honey-flavoring, corn syrup and a vitamin/mineral mixture was prepared and was sprayed onto a quantity of the dried flakes to achieve the percentages by weight of the components contributed by the coating listed in example 1 after the cereal is dried at room temperature. The dry cereal formed included the following percentages of the RDA of the following vitamins and/or minerals: 15% vitamin A, 25% vitamin C, 25% calcium, 10% vitamin D, 8% phosphorus, 8% magnesium, 4% copper and 100% of the RDA of iron, vitamin E, thiamine, riboflavin, niacin, vitamin $B_6$, folate, vitamin $B_{12}$, pantothenic acid and zinc. It is noted that commercial methods of cereal food production may be adapted to produce Soy-Pro commercially.

While the invention has been illustrated and described in detail in the foregoing description, the same is to be considered as illustrative and not restrictive in character, it being understood that only the preferred embodiment has been shown and described and that all changes and modifications that come within the spirit of the invention are desired to be protected. For example, the cereal food product described herein may further include fruit pieces, such as raisins, cranberries, strawberries, dates and nut pieces, including pecans, almonds, and peanuts. Other flavoring agents may be included, such as honey and cinnamon flavors, apple cinnamon and maple. In addition, all references cited herein are indicative of the level of skill in the art and are hereby incorporated by reference in their entirety.

What is claimed is:

1. A soy-based, flaked food product, comprising pre-toasted, defatted soy flakes, a cereal grain, an exogenous source of protein and isolated starch, said defatted soy flakes present in greater amount by weight in said product than said cereal grain.

2. The food product of claim 1, wherein said exogenous protein is a soy protein isolate.

3. The food product of claim 1, wherein said cereal grain is selected from the group consisting of corn, oats, wheat, sorghum, rye, rice and combinations thereof.

4. The food product of claim 3, wherein said cereal grain is corn.

5. The food product of claim 1, wherein said starch is isolated from corn, oats, wheat, sorghum, rye, rice, or combinations thereof.

6. The food product of claim 1, wherein said isolated starch is a modified food starch.

7. The food product of claim 1, wherein said flaked food product has a flavoring agent coated thereon.

8. The food product of claim 1, wherein said coating further comprises a composition comprising vitamins and minerals.

9. The food product of claim 1, wherein said soy flakes are present in said product in an amount of about 30% by weight to about 70% by weight.

10. The food product of claim 1, wherein said cereal grain is present in said product in an amount no more than about 10% by weight.

11. The food product of claim 1, said product further comprising sodium bicarbonate.

12. The food product of claim 1, wherein said pre-toasted, defatted soy flakes are formed by heating defatted soy flakes at a temperature of about 150° C. to about 300° C. for about 3 minutes to about 10 minutes.

13. The food product of claim 12, wherein said soy flakes are heated at about 205° C. for about 5 minutes.

14. A soy-based, flaked food product, comprising:
    defatted soy flakes, a cereal grain, sodium bicarbonate, an exogenous source of protein and isolated food starch, said defatted soy flakes present in said product in greater amount by weight than said cereal grain.

15. The food product of claim 14, wherein said defatted soy flakes are pre-toasted.

16. The food product of claim 14, wherein said soy flakes are present in said product in an amount of about 30% by weight to about 70% by weight and said cereal grain is present in said product in an amount of no more than about 10% by weight.

17. A soy-based, flaked food product, comprising:
    about 30% by weight to about 70% by weight pre-toasted, defatted soy flakes, about 3% by weight to about 20% by weight of a cereal grain, about 0.5% by weight to about 10% by weight of isolated starch, about 1% by weight to about 30% by weight of a soy protein isolate, and about 0.5% by weight to about 2% by weight of sodium bicarbonate.

18. The food product of claim 17, wherein said cereal grain is corn.

19. The food product of claim 17, wherein said product further includes a flavoring agent.

20. The food product of claim 17, wherein said flavoring agent is selected from sucrose, honey and combinations thereof.

21. The food product of claim 17, wherein said starch is isolated from corn, oats, wheat, sorghum, rye, rice, or combinations thereof.

22. The food product of claim 17, wherein said cereal grain is selected from the group consisting of corn, oats, wheat, sorghum, rye, rice, and combinations thereof.

\* \* \* \* \*

UNITED STATES PATENT AND TRADEMARK OFFICE
CERTIFICATE OF CORRECTION

PATENT NO.    : 6,391,374 B1
DATED         : May 21, 2002
INVENTOR(S)   : Gray et al.

It is certified that error appears in the above-identified patent and that said Letters Patent is hereby corrected as shown below:

<u>Title page,</u>
Item [56], References Cited, OTHER PUBLICATIONS, delete "36" and replace with -- 136 --.

<u>Column 1,</u>
Line 34, delete "bicarboatlo" and replace with -- bicarbonate to --.

<u>Column 5,</u>
Line 25, delete the period "." before "as".

Signed and Sealed this

Seventeenth Day of December, 2002

JAMES E. ROGAN
*Director of the United States Patent and Trademark Office*